(12) United States Patent
Nakibly et al.

(10) Patent No.: US 11,003,616 B1
(45) Date of Patent: May 11, 2021

(54) DATA TRANSFER USING POINT-TO-POINT INTERCONNECT

(71) Applicant: Amazon Technologies, Inc., Seattle, WA (US)

(72) Inventors: Guy Nakibly, Kedumim (IL); Adi Habusha, Moshav Alonei Abba (IL); Yaniv Shapira, Bet Itzhak (IL); Daniel Joseph Grey, Givatayim (IL)

(73) Assignee: Amazon Technologies, Inc, Seattle, WA (US)

( * ) Notice: Subject to any disclaimer, the term of this patent is extended or adjusted under 35 U.S.C. 154(b) by 236 days.

(21) Appl. No.: 15/635,078

(22) Filed: Jun. 27, 2017

(51) Int. Cl.
  *G06F 13/42* (2006.01)
  *G06F 13/40* (2006.01)

(52) U.S. Cl.
  CPC ...... *G06F 13/4282* (2013.01); *G06F 13/4013* (2013.01); *G06F 13/4022* (2013.01); *G06F 13/4072* (2013.01)

(58) Field of Classification Search
  None
  See application file for complete search history.

(56) References Cited

U.S. PATENT DOCUMENTS

| | | | | |
|---|---|---|---|---|
| 4,949,301 A | * | 8/1990 | Joshi | G06F 5/065 711/100 |
| 5,557,798 A | * | 9/1996 | Skeen | G06F 3/0481 705/35 |
| 2007/0253436 A1 | * | 11/2007 | Henry | G06F 9/5077 370/401 |
| 2008/0228772 A1 | * | 9/2008 | Plamondon | G06F 16/9574 |
| 2008/0317025 A1 | * | 12/2008 | Manula | H04Q 1/064 370/389 |
| 2009/0013056 A1 | * | 1/2009 | Weinstock | G06F 3/1462 709/208 |
| 2009/0307660 A1 | * | 12/2009 | Srinivasan | G06F 8/314 717/114 |
| 2010/0121972 A1 | * | 5/2010 | Samuels | H04L 47/10 709/231 |
| 2012/0185706 A1 | * | 7/2012 | Sistla | G06F 1/3203 713/300 |
| 2013/0124934 A1 | * | 5/2013 | Jones | G01R 31/318547 714/727 |
| 2013/0340977 A1 | * | 12/2013 | Singleton | H05K 7/20809 165/104.21 |
| 2014/0115208 A1 | * | 4/2014 | Willey | G06F 13/4265 710/105 |
| 2015/0109024 A1 | * | 4/2015 | Abdelfattah | G06F 17/5054 326/41 |
| 2016/0284046 A1 | * | 9/2016 | Koker | G06T 15/80 |

(Continued)

*Primary Examiner* — Henry Tsai
*Assistant Examiner* — Christopher A Bartels
(74) *Attorney, Agent, or Firm* — Weaver Austin Villeneuve & Sampson LLP

(57) ABSTRACT

In a computer comprising a plurality of integrated circuits (ICs), each IC may be connected to all other ICs via a respective point-to-point interconnect. A source IC divides the data to be transmitted to a destination IC for a transaction to generate multiple data cells so that each data cell includes a different portion of the data. The source IC transmits one of the data cells to the destination IC and remaining data cells to intermediate ICs, wherein an intermediate IC is an IC other than the source IC or the destination IC. The intermediate ICs forward the remaining data cells to the destination IC.

20 Claims, 9 Drawing Sheets

(56) References Cited

U.S. PATENT DOCUMENTS

2016/0330083 A1\* 11/2016 Djukic ................ H04L 12/1492
2017/0286339 A1\* 10/2017 Yang ....................... G06F 1/183
2020/0244728 A1\* 7/2020 Jha ........................ H04L 67/327

\* cited by examiner

600

602
DETERMINE, BY A SOURCE INTEGRATED CIRCUIT (IC) OF ICS IN A COMPUTER, THAT DATA NEEDS TO BE TRANSFERRED TO A DESTINATION IC OF THE ICS FOR A TRANSACTION, EACH IC IN THE ICS CONNECTED TO OTHER ICS VIA A RESPECTIVE POINT-TO-POINT INTERCONNECT, THE ICS FURTHER COMPRISING INTERMEDIATE ICS

604
GENERATE DATA CELLS FROM THE DATA, WHEREIN EACH OF THE DATA CELLS INCLUDES A DIFFERENT PORTION OF THE DATA

606
TRANSMIT ONE OF THE DATA CELLS TO THE DESTINATION IC AND REMAINING DATA CELLS TO INTERMEDIATE ICS VIA THE RESPECTIVE POINT-TO-POINT INTERCONNECT

FIG. 6

DATA TRANSFER USING POINT-TO-POINT INTERCONNECT

BACKGROUND

Many organizations or companies use server computers to provide services such as cloud computing, analytics, web services, storage, databases, applications, deployment services, etc. to a potentially larger number of client computers. The clients can use these services to power a wide variety of workloads such as storage, data processing and warehousing, executing of web and mobile applications, archiving, and many other tasks. The demand for higher processing power as well as memory capacity and performance is constantly rising for both the client computers and the server computers.

Server computers generally utilize multiple sockets to house various integrated circuits to support higher processing power and memory capacity. Each socket on a printed circuit board (PCB) can house integrated circuits such as processors, memories, controllers, etc. One or more interconnects can be utilized for communication between the sockets on the PCB. Some server computers utilize unidirectional or bidirectional ring topologies for the interconnects. However, latency for the data transfer between a source IC and a destination IC using ring topologies is generally a function of the number of hops between the source IC and the destination IC, i.e., the total number of ICs that need to be jumped by the data to get to the destination IC from the source IC. For example, latency for the data transfer between the two sockets will be higher for the sockets that are far apart in the ring as compared to the sockets that are close to each other. Thus, the systems utilizing ring topologies may not always provide the most efficient way of data transfer among the sockets.

BRIEF DESCRIPTION OF THE DRAWINGS

Various embodiments in accordance with the present disclosure will be described with reference to the drawings, in which:

FIG. 6 illustrates a method performed by a source IC in some embodiments of the disclosed technologies;

DETAILED DESCRIPTION

Figure 1:
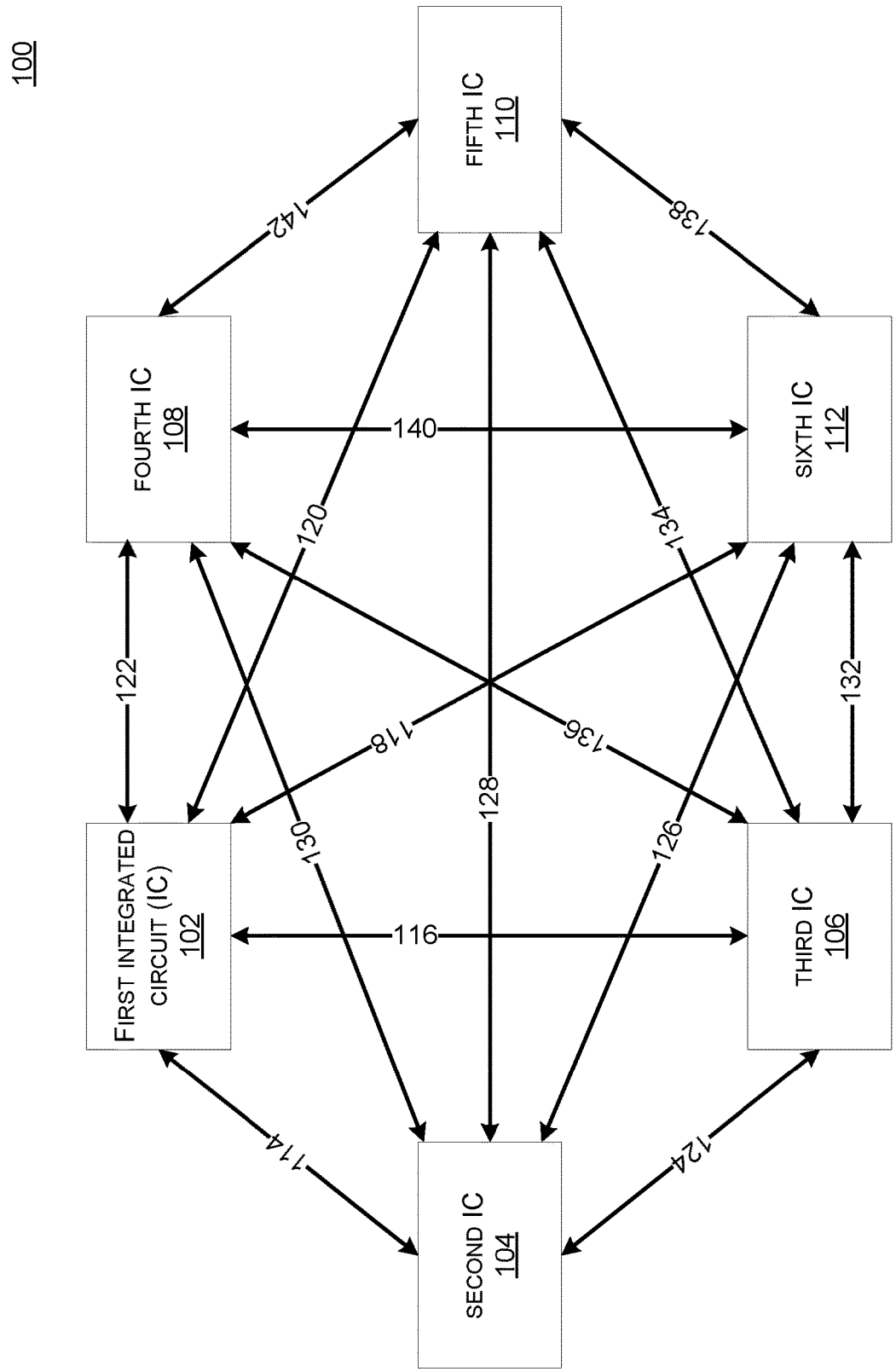
FIG. 1 illustrates an apparatus using point-to-point interconnect between integrated circuits in a server computer, in one embodiment of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Server computers may include multiple components such as multicore processors, volatile memory, non-volatile memory, various controllers, etc. The components can be in the form of one or more integrated circuits, system-on-chip (SoCs), system-in-package (SiP), multi-chip modules (MCMs), or any suitable package that can be housed in a socket or can be through-hole mounted to a platform. For example, the components may be packaged using land grid array (LGA), ball grid array (BGA), pin grid array (PGA) or any suitable packaging. The platform may include a printed circuit board (PCB), a motherboard, a processor board, a card, etc. However, for the purposes of simplicity, the term "PCB" will be used for the platform in this specification. A socket can provide an electromechanical interface between the package and the PCB via pins or pads. Sockets can allow easy swapping of the components as compared to surface mounted components. For the purposes of discussion, the term "integrated circuit" may be used for a component in this specification. Each integrated circuit may be housed in a socket or surface mounted on the PCB.

Some server computers may use a ring topology for interconnects between the integrated circuits (ICs) on a PCB. In the ring topology, the ICs may be connected in the form of a ring such that each IC is connected to exactly two other ICs. The data transfer can take place from one IC to another IC around the ring. Ring topology may utilize unidirectional or bidirectional rings. In a unidirectional ring, data transfer can take place only in a single direction around the ring. In a bidirectional ring, data transfer can take place in either direction. In some implementations, a unified coherent address space can be maintained through a coherency protocol across an inter-socket interconnect, e.g., HyperTransport by AMD® or QuickPath Interconnect (QPI) by Intel®. However, the ring topology may not provide an efficient way for data transfer between the ICs. For example, latency for the data transfer between two ICs may depend upon the total number of ICs in the ring and the locations of the two ICs within the ring. Additionally, as the number of ICs is increased, e.g., to support higher processing power or memory capacity, latency for the data transfer among the ICs may increase resulting in lower system throughput. Thus, server computers utilizing ring topology for data transfer among the ICs may provide higher latency and lower throughput, especially for unidirectional rings.

Some embodiments of the disclosed technologies can provide lower latency and higher throughput for data transfer among ICs on a PCB by connecting each of the ICs to all other ICs via a respective point-to-point interconnect. A point-to-point interconnect between two ICs may indicate a dedicated link between the two ICs. For example, the point-to-point interconnect may be based on the peripheral component interconnect (PCI) express protocol or any variation of the PCI express protocol. Each IC can allocate certain bandwidth (e.g., "B") for transmit and receive transactions in either direction with all other ICs. Assuming "M" number of ICs that are connected on the PCB via their respective point-to-point interconnects, each IC can allocate (B/(M−1))

bandwidth in each direction for each respective point-to-point interconnect. The M number of ICs may include a source IC, a destination IC, and one or more intermediate ICs. In some embodiments, data that needs to be transferred from a source IC to a destination IC for a transaction can be divided by the source IC to generate "N" number of data cells. Values for M and N can be different or same. Each data cell may include a packet, e.g., a transaction layer packet (TLP). For example, each packet may include a portion of the data as the payload. Each of the N data cells can be transmitted by the source IC to one of the ICs using its respective point-to-point interconnect with that IC. The destination IC may receive the N data cells over multiple cycles via one or more intermediate ICs based on the value of N. Each of the intermediate ICs may process its received data cell and transmit it to the destination IC if their point-to-point interconnect to the destination IC is available. In some embodiments, a credit-based flow control protocol may be used to determine if the point-to-point interconnect with the receiving IC is available for data transfer. In some embodiments, the intermediate IC can arbitrate between the data cells if more than one data cell needs to be transmitted to the destination IC at a given time. The destination IC can buffer the data cells received from the source IC and the remaining ICs, and reorder them if necessary before consuming the integrated data.

A source IC can be one of the "M" ICs which is configured to generate N data cells from data for a transaction with a destination IC. In some embodiments, value of N may be pre-determined for each transaction or source IC. For example, the transaction may include writing data to an address or reading data from an address. In one instance, the source IC may send the data cells for a transaction initiated by the source IC to write the data at an address associated with the destination IC. In another instances, the source IC may send the data cells for a transaction initiated by the destination IC to read the data at an address associated with the source IC. The destination IC may be the final destination of the transaction and is configured to consume the data for the transaction. The destination IC may consume each data cell at a time or may first integrate the received data cells to reproduce the data for the transaction. The destination IC may store the assembled data in the memory or use it for further processing. An intermediate IC can be one of the "M" ICs that is not a source IC or a destination IC. The intermediate IC may be configured to receive a data cell from the source IC or another intermediate IC and may forward the data cell to another intermediate IC or to the destination IC without altering the payload of the data cell.

Thus, as compared to server computers utilizing ring topologies for data transfer, some embodiments can provide a lower latency and higher throughput by splitting the data transfer bandwidth among the ICs. In some instances, once the source IC distributes the data cells among the intermediate ICs, data transfer to the destination IC from the intermediate ICs in the next cycle can provide full bandwidth if their respective point-to-point interconnects to the destination IC are available.

FIG. 1 illustrates an apparatus 100 using point-to-point interconnect between ICs in a server computer, in one embodiment of the disclosed technologies.

The apparatus 100 may include a first integrated circuit (IC) 102, a second IC 104, a third IC 106, a fourth IC 108, a fifth IC 110 and a sixth IC 112. Each of the ICs 102-112, e.g., the first IC 102, second IC 104, third IC 106, fourth IC 108, fifth IC 110, or the sixth IC 112, may include one or more components, e.g., central processing units (CPUs), graphics processing units (GPUs), memory (e.g., SRAM, DRAM, ROM, EEPROM, flash, etc.), controllers (e.g., memory controllers, network interface controllers, Ethernet controllers, input/output (I/O) controllers), etc. In some implementations, the server computer may include an x86 CPU platform, e.g., Xeon, Pentium, Atom, Athlon, etc., and each of the ICs 102-112 may include one or more processing cores.

Each of the ICs 102-112 may be in the form of a system on a chip (SoC), system in a package (SiP), multi-chip module (MCM), or any suitable combination of circuits in a package that can be housed in a socket or can be mounted on a printed circuit board (PCB). A socket can provide an electromechanical interface between the respective IC and the PCB via pins or pads. In some embodiments, each of the ICs 102-112 can be housed in a respective socket on the PCB in the server computer. For example, the first IC 102 can be housed in a first socket, the second IC 104 can be housed in a second socket, the third IC 106 can be housed in a third socket, the fourth IC 108 can be housed in a fourth socket, the fifth IC 110 can be housed in a fifth socket, and the sixth IC 112 can be housed in a sixth socket on the PCB.

As illustrated in FIG. 1, each of the ICs may be connected to all other ICs via a respective point-to-point interconnect. In some embodiments, the point-to-point interconnect may be based on peripheral component interconnect (PCI) express protocol or a variation of PCI express protocol. PCI express protocol may utilize different layers (e.g., physical layer, data link layer, transaction layer, software layer, etc.) of the open systems interconnection (OSI) model for communication between the ICs. The software layer of the OSI model can generate read and write requests that can be transported by the transaction layer to an IC using a packet-based protocol. The data link layer can add sequence numbers and cycle redundancy checks to these packets to create a reliable data transfer mechanism. The basic physical layer can consist of a dual simplex channel implemented as a transmit pair and a receive pair. The transmit and receive pair together can be called a lane. PCI express can employ point-to-point serial links which can support a point-to-point communication channel between two PCI express ports using one or more lanes. Each lane may include a bidirectional serial link. In some implementations, each of the ICs 102-112 may include respective PCI express ports to communicate with the other ICs using their respective PCI express link via the point-to-point interconnect. In some implementations, for "M" number of total ICs, each of the M ICs may include an "M–1" number of point-to-point interconnect interfaces to communicate with remaining "M–1" number of ICs on the PCB. In one example, M can be "6" as shown in FIG. 1, and each of the ICs 102-112 may include five point-to-point interconnect interfaces to communicate with the other five ICs.

As illustrated in FIG. 1, the first IC 102 and the second IC 104 may communicate with each other via an interconnect 114, the first IC 102 and the third IC 106 may communicate with each other via an interconnect 116, the first IC 102 and the sixth IC 112 may communicate with each other via an interconnect 118, the first IC 102 and the fifth IC 110 may communicate with each other via an interconnect 120, and the first IC 102 and the fourth IC 108 may communicate with each other via an interconnect 122. Similarly, the second IC 104 and the third IC 106 may communicate with each other via in interconnect 124, the second IC 104 and the sixth IC 112 may communicate with each other via in interconnect 126, the second IC 104 and the fifth IC 110 may communicate with each other via in interconnect 128, and the second IC 104 and the fourth IC 108 may communicate with each other via in interconnect 130. The third IC 106 and the sixth IC 112 may communicate with each other via in interconnect 132, the third IC 106 and the fifth IC 110 may communicate with each other via in interconnect 134, and the third IC 106 and the fourth IC 108 may communicate with each other via in interconnect 136. The sixth IC 112 and the fifth IC 110 may communicate with each other via in interconnect 138 and the sixth IC 112 and the fourth IC 108 may communicate with each other via in interconnect 140. The fifth IC 110 and the fourth IC 108 may communicate with each other via in interconnect 142. In some embodiments, each of the interconnects 114-142 may be based on PCI express bus protocol. However, embodiments can support other bus protocols without deviating from the scope of the disclosed technologies. It will be understood that, for the purposes of discussion, in some embodiments, each of the interconnects 114-142 may represent a respective interconnect between two sockets on the PCB irrespective of the number of ICs in each socket.

According to some embodiments, data for a transaction may be transferred from a source IC to a destination IC via one or more intermediate ICs. As illustrated in FIG. 1, any of the ICs 102-112 may be configured as a source IC, a destination IC, or an intermediate IC. Each of the ICs 102-112 may be configured to transfer data among one another for different transactions via their respective point-to-point interconnect. For example, the data may be transferred from a source IC to a destination IC for a write transaction to write at an address associated with the destination IC. Alternatively, the data may be transferred from a source IC to a destination IC in response to a read transaction initiated by the destination IC to read from an address associated with the source IC. The point-to-point interconnect between the ICs does not have to be coherent since the destination of the data transfer is known and therefore no snooping of the ICs may be necessary using the interconnect architecture as shown in FIG. 1.

In the embodiments, each of the ICs 102-112 may have their respective independent memory which may not be shared with the other ICs. In some implementations, each of the ICs 102-112 may have a respective memory space allocated in the main memory of the server computer, e.g., DRAM, which may not be shared among the ICs 102-112. Thus, each of the ICs 102-112 can be non-coherent with the other ICs.

In some embodiments, data that needs to be transferred for a transaction from the source IC to the destination IC can be divided by the source IC to generate multiple data cells so that each data cell includes a different portion of the data. For example, for M number of ICs, data may be divided into N data cells so that each data cell includes a different portion of the data. The value of N can be equal to (M−1), more than (M−1), or less than (M−1). Thus, if the bandwidth for data transfer on a single point-to-point interconnect between two ICs is B for a unidirectional ring, in some embodiments, the bandwidth may be divided as (B/(M−1)) among the (M−1) point-to-point interconnects for data transfer in each direction.

In one embodiment, the value of N may be pre-determined for a transaction. For example, in a multi-tenancy environment, in some instances, it may be desirable to control the bandwidth for transactions associated with a certain tenant. Thus, the value of N can be assigned accordingly to achieve the desired bandwidth. In some implementations, the value of N may be programmed in a configuration register which can be used by the source IC to divide the data. In some embodiments, the value of N may be determined based on the buffer sizes associated with each receiving IC. In some embodiments, the value of N may be assigned based on the available bandwidth or the configuration of the point-to-point interconnect (e.g., number of lanes) between the source IC and the other ICs. In some embodiments, the value of N may be assigned based on the size of the data cell that can be supported by the protocol for transmitting the packet.

In some embodiments, N can be made smaller than (M−1) to minimize the number of hops among the intermediate ICs to achieve overall higher bandwidth for the data transfer. In such cases, the N data cells may reach the destination IC via the intermediate ICs over two cycles if all the necessary point-to-point interconnects are available. In some embodiments, the data for a transaction may be divided into more data cells than the available ICs. Such transactions may result in lower bandwidth due to the higher number of hops for the data cells among the intermediate ICs before reaching the destination IC. In such cases, the N data cells may reach the destination IC over more than two cycles.

Each data cell for a transaction may include information associated with the destination of the transaction. For example, the source IC may provide an address for each data cell or an address for the integrated data that can be used by the destination IC to complete the transaction. The source IC may be configured to transmit the N data cells to all other ICs via their respective point-to-point interconnect using (B/(M−1)) bandwidth. In some embodiments, the source IC may transmit one of the data cells to the destination IC and remaining data cells to the one or more intermediate ICs over one or more cycles. The destination IC may buffer the received data cell. Each of the intermediate ICs that received the data cell may be configured to process the data cell and determine if the point-to-point interconnect to the destination IC is available to transmit their received data cell to the destination IC. If the respective point-to-point interconnect to the destination IC is available, each intermediate IC that received the respective data cell can process the received data cell simultaneously and forward the respective data cell to the destination IC, thus providing the full bandwidth for data transfer in the second cycle. If the point-to-point interconnect to the destination IC is not available for an intermediate IC, that intermediate IC may forward the received data cell to another intermediate IC which, in turn, can transmit that data cell to the destination IC if its point-to-point interconnect to the destination IC is available.

The destination IC may consume each data cell as it arrives or may buffer the data cells until all the N data cells for the same transaction have been received. For example, consuming a data cell may include storing the data cell in memory or using the data cell for further processing. In some instances, the destination IC may store each received data cell in memory at an address associated with the transaction. In another instance, the destination IC may integrate the N data cells associated with a transaction to consume the data for the transaction. In some embodiments, a sequence number may be associated with each data cell that can be used to integrate the data. For example, the sequence number may be used to identify which portion of the data a particular data cell belongs to. Generation of multiple data cells from the data is explained with reference to FIG. 4.

Figure 4:
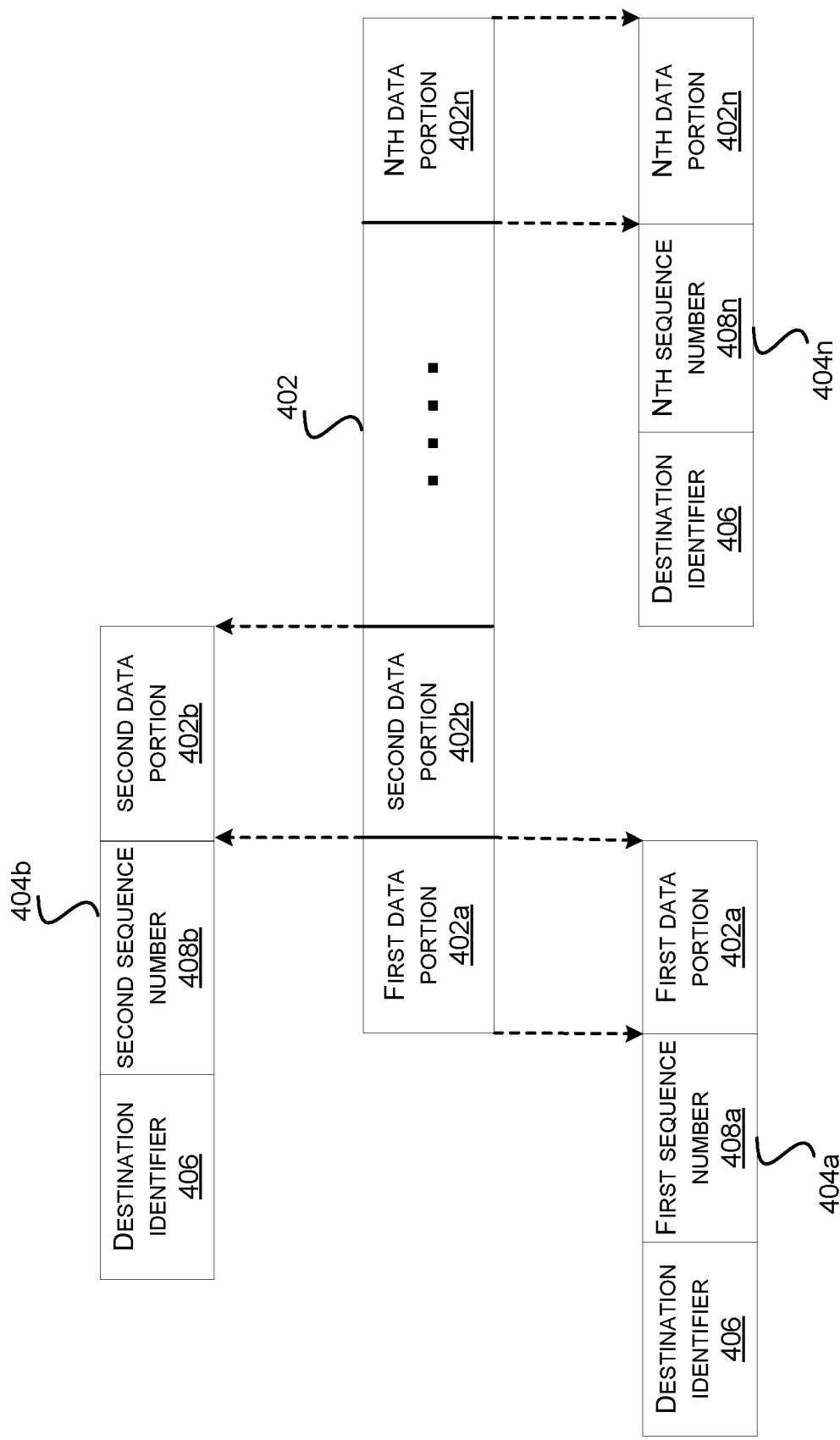
FIG. 4 illustrates an exemplary diagram to show the generation of multiple data cells from the data, according to one embodiment of the disclosed technologies.

FIG. 4 illustrates an exemplary diagram 400 to show the generation of multiple data cells from the data, according to one embodiment of the disclosed technologies.

In some embodiments, a source IC can divide data to be transmitted to a destination IC for a transaction to generate multiple data cells. In some implementations, the data can be divided into "N" different portions so that each data cell may include a different portion of the data. "N" can be a positive integer, e.g., 4, 5, 10, or another number. The "N" different portions of the data may or may not be of same size. As shown in FIG. 4, data 402 can be divided to generate multiple data cells 404a, 404b, 404c, 404d, . . . , 404n. As an example, for "N" equal to five, a first data cell 404a may include a first data portion 402a, a second data cell 404b may include a second data portion 402b, a third data cell 404c may include a third data portion, a fourth data cell 404d may include a fourth data portion and an $N^{th}$ data cell 404n may include a fifth data portion 402n. Note that the third data cell 404c and the fourth data cell 404d are not shown in FIG. 4 for the ease of illustration.

In some embodiments, each of the data cells 404a, 404b, . . . , 404n may further include a destination identifier and a respective sequence number. For example, the first data cell 404a may also include a destination identifier 406 and a first sequence number 408a. The second data cell 404b may also include the destination identifier 406 and a second sequence number 408b. The $N^{th}$ data cell 404n may also include the destination identifier 406 and an $N^{th}$ sequence number 408n. The destination identifier 406 may be used to identify a destination IC for the transaction. For example, the destination identifier 406 may be derived from an address associated with the transaction, bus/device/function (B/D/F) parameters associated with the destination IC, or any suitable measure. Each of the sequence numbers 408a, 408b, . . . , 408n may indicate a sequence of the divided data, and may be used by the destination IC to integrate the received data in the right order. In some implementations, each of the sequence numbers 408a, 408b, . . . , 408n may include information related to a total number of data portions associated with the transaction that can be used by the destination IC to initiate the data integration after all the relevant data cells including the total number of data portions have been received.

In some embodiments, each of the data cells 404a, 404b, . . . , 404n may include a packet, e.g., a transaction layer packet (TLP). The packet may include a packet header and payload data. The packet header may include information associated with the transaction with the destination IC. For example, in some implementations, the destination identifier and the respective sequence number may be part of the packet header, and the respective portion of the data may be part of the payload data. In some implementations, the packet header may include a transaction identifier to associate all the data cells with a particular transaction. The packet header may include other information associated with the transaction which is not discussed here for the purposes of simplicity.

In some embodiments, a determination of whether a point-to-point interconnect is available between a source IC and a destination IC may be performed based on a flow control mechanism implemented between the source IC and the destination IC. For example, the PCI express based protocol for the point-to-point interconnect can allow implementation of a flow control mechanism between a transmitter and a receiver. The transmitter can be the source IC or any intermediate IC that transmits the data to the destination IC or to another intermediate IC. The receiver can be the destination IC or an intermediate IC. The flow control can be handled by the transaction layer in cooperation with the data link layer. The flow control information can be conveyed between the transmitter and the receiver across the PCI express link using data link layer packets. The flow control mechanism may allow different credit types for different types of transactions (e.g., memory, configuration, I/O, messages). The transaction layer can perform flow control accounting functions for received TLPs and can "gate" TLP transmissions based on available credits for transmission. In some implementations, both the transmitter and the receiver can exchange their credit limits in terms of flow control units when a link is established for a point-to-point interconnect between the transmitter and the receiver. In some implementations, the transmitter may track the credits advertised before allowing transmission of a given packet and the receiver may track the total number of credits granted to the transmitter since initialization. In some embodiments, the credits granted may depend upon the buffer size of the receiver. As the received packets are processed, the credits can be incremented. The flow control mechanism may allow the transmitter to transmit a data cell to the receiver only when the transmitter has enough flow control credits to transmit the data using the respective link and the receiver has enough flow control credits (e.g., buffer space) to accept the data. If the transmitter does not have enough credits to transmit the packet, the transmission may be blocked.

In one embodiment, "M" can be equal to six and "N" can be equal to five. Referring back to FIG. 1, in one instance, the first IC 102 (e.g., source IC) may initiate data transfer with the sixth IC 112 (e.g., destination IC) for a transaction. The first IC 102 may divide the data for the transaction to generate five data cells. Each of the five data cells can include different portions of the data. For example, if the data is 12 double words (DWs) long, a first data cell may include the first 2 DWs of the data, a second data cell may include next 2 DWs of the data, a third data cell may include the next 2 DWs of the data, a fourth data cell may include the next 3 DWs of the data and the fifth data cell may include the last 3 DWs of the data. Referring back to FIG. 4, the data 402 may be divided into five data portions. The first data portion 402a may include 2 DWs of data, the second data portion 402b may include next 2 DWs of data, a third data portion (not shown) may include 2 DWs of data, a fourth data portion (not shown) may include 3 DWs of data, and the $N^{th}$ data portion 402n may include last 3 DWs of data. The first data cell may be the first data cell 404a, the second data cell may be the second data cell 404b, and the fifth data cell may be the $N^{th}$ data cell 404n. Note that the third and fourth data cells are not shown in FIG. 4. As an example, the destination identifier 406 may be "6", the first sequence number 408a may be "1", second sequence number 408b may be "2", and the $N^{th}$ sequence number 408n may be "5."

In some embodiments, the first IC 102 may transmit one of the five data cells to the sixth IC 112 and the remaining four data cells to the intermediate ICs, e.g., the second IC 104, third IC 106, fifth IC 110, and the fourth IC 108. For example, the first IC 102 may transmit the first data cell 404a to the destination sixth IC 112 via the interconnect 118. The first IC 102 may also transmit the second data cell 404b to the second IC 104 via the interconnect 114, the third data cell to the third IC 106 via the interconnect 116, the fourth data cell to the fifth IC 110 via the interconnect 120 and the fifth data cell 404n to the fourth IC 108 via the interconnect 122. In the next cycle, the second IC 104, third IC 106, fifth IC 110 and the fourth IC 108 may transmit the received second data cell 404b, third data cell, fourth data cell and the fifth data cell 404n respectively to the sixth IC 112 via the interconnects 126, 132, 138 and 140 respectively if the interconnects 126, 132, 138, and 140 are available. Thus, some embodiments can provide full bandwidth for the transfer of data cells to the destination IC after going through the intermediate ICs once.

The second IC 104 may process the received second data cell 404b to identify the destination of the second data cell 404b as the sixth IC 112 based on the packet header. In one implementation, the second IC 104 may parse the packet header of the second data cell 404b to identify the destination IC based on the destination identifier 406 of the second data cell 404b. For example, if the destination identifier 406 is equal to six, the second IC 104 may determine that the received second data cell 404b is to be transmitted to the sixth IC 112. The second IC 104 may then determine if the interconnect 126 to the sixth IC 112 is available based on the flow control mechanism implemented by the second IC 104 and the sixth IC 112. If the interconnect 126 is available, the second IC 104 may transmit the second data cell 404b to the sixth IC 112 via the interconnect 126. In some embodiments, the second IC 104 may store the received second data cell 404b in memory associated with the second IC 104 for transmitting it at a later point in time.

If the interconnect 126 is not available, the second IC 104 may transmit the second data cell 404b to any of the third IC 106, fifth IC 110 or the fourth IC 108 based on whether the interconnect 124, 128 or 130 respectively is available. For example, if the interconnect 130 to the fourth IC 108 is available, the second IC 104 may transmit the second data cell 404b to the fourth IC 108 via the interconnect 130. The fourth IC 108 may store the second data cell 404b in memory associated with the fourth IC 108 and may determine that the received second data cell 404b is to be transmitted to the sixth IC 112 based on the destination identifier 406 of the second data cell 404b. The fourth IC 108 may then determine if the interconnect 140 to the sixth IC 112 is available. If the interconnect 140 is available, the fourth IC 108 may transmit the second data cell 404b to the sixth IC 112 via the interconnect 140. If the interconnect 140 is not available, the fourth IC 108 may transmit the second data cell 404b to any of the third IC 106, fifth IC 110 or the first IC 102 based on whether their respective interconnect is available. Thus, the data cells which were not directly transmitted to the destination IC by the source IC can be transmitted indirectly via the intermediate ICs until they reach the destination IC.

In some instances, an intermediate IC may have more than one data cell to transmit to the same destination IC. The intermediate IC may be configured to determine which one of the received data cells will be transmitted first to the destination IC. For example, at any instance, the fourth IC 108 may have received the second data cell 404b from the second IC 104 to transmit to the sixth IC 112 and the third data cell from the third IC 106 to transmit to the sixth IC 112. In some implementations, the fourth IC 108 may perform arbitration to determine which data cell may be transmitted to the sixth IC 112 via the interconnect 140. In some embodiments, the data cell which would have higher latency to reach the destination IC as compared to another data cell may be given preference. For example, the higher latency may result from jumping through a number of intermediate ICs before reaching the destination IC.

In some instances, a point-to-point interconnect to any of the ICs may not be available to transfer the respective data cells. In such cases, in some embodiments, incoming traffic may be pushed back to receive additional data cells. For example, the receiving IC may make its point-to-point interconnect unavailable with the transmitting IC in order to not accept any additional data cells.

The sixth IC 112 may be configured to integrate the received data cells, e.g., the first data cell 404a, second data cell 404b, third data cell, fourth data cell, and the $N^{th}$ data cell 404n, associated with the same transaction to consume the data. For example, a transaction identifier or any transaction related information in the packet header of the received data cells may be used to associate the data cells with the same transaction. In some implementations, the sixth IC 112 may buffer the data cells as they are received from different ICs. The sixth IC 112 may use the sequence number associated with each received data cell to integrate the data in the correct sequence or order. The sequence number may include information related to the order of the data portions and a total number of the data portions. The sixth IC 112 may consume the integrated data for the transaction. For example, in one instance, the sixth IC 112 may store the integrated data in memory for a write transaction initiated by the first IC 102 to write to an address in the sixth IC 112. In another instance, the data may be the read data provided by the first IC 102 in response to a read transaction initiated by the sixth IC 112. In some instances, the sixth IC 112 may use the data for further processing, e.g., for networking, storage, video, audio, etc.

Referring back to FIG. 1, each of the ICs 102-112 may allocate B bandwidth for transmission and reception of data on a single point-to-point interconnect. As shown in FIG. 1, since each of the ICs 102-112 is connected to five other ICs, the B bandwidth may be divided by five (e.g., B/5) among the five interconnects for each IC. Assuming that the time to transmit a data cell on a single interconnect is $T_t$ with B bandwidth, the time to transmit on five interconnects may be calculated as $(5 \times T_t)$ with (B/5) bandwidth for each interconnect. Assuming that the time to process a data cell by an IC is $T_s$, each of the intermediate ICs 104, 106, 108 and 110 may take $T_s$ time to process the received data cell simultaneously from the first IC 102. In the next cycle, each of the intermediate ICs 104, 106, 108 and 110 may take $(5 \times T_t)$ time to transmit their received data cells to the sixth IC 112 via their respective interconnects 126, 132, 140 and 138. Thus, the time to transmit "N" data cells by the first IC 102 to the sixth IC 112 may be calculated as:

$$(N/5) \times (5 \times T_t) + T_s + (5 \times T_t) = (N+5) \times T_t + T_s. \qquad \text{Equation (1)}$$

Generalizing equation (1) for "M" number of ICs, the time to transmit "N" data cells may be calculated as:

$$(N/(M-1)) \times ((M-1) \times T_t) + T_s + ((M-1) \times T_t) = (N+(M-1)) \times T_t + T_s. \qquad \text{Equation (2)}$$

Therefore, some embodiments of the disclosed technologies can allow full bandwidth for data transfer between the source IC and the destination IC after one jump through the intermediate ICs if the respective interconnects to the destination IC are available in the second cycle. In addition, it is obvious from equations 1 and 2 that $T_s$ is independent of the total number of ICs interconnected (e.g., "M").

In some implementations, N can be greater than M. As an example, "M" can be equal to six and "N" can be equal to eight. For example, in some implementations, the size of each data cell can be limited to a certain value, e.g., due to the buffer size of the transmitting IC, the buffer size of the receiving IC, configuration of the point-to-point interconnects, etc. The source IC (e.g., the first IC 102) may divide the data for the transaction to generate eight data cells. Each of the eight data cells can include different portions of the data. The eight data cells can be transmitted by the first IC 102 over multiple cycles. For example, in one implementation, five data cells may be transmitted in the first cycle (as discussed previously) and the remaining three data cells may be transmitted in the second cycle. One of the remaining three data cells may be transmitted directly to the destination IC (e.g., the sixth IC 112) and the other two data cells may be transmitted to any of the available intermediate ICs 104, 106, 108 or 110 for transmitting to the sixth IC 112 in the next cycle or later.

In some implementations, N can be smaller than (M−1). For example, in some instances, data for a transaction may be divided into fewer data cells (with bigger size for each data cell) to achieve higher bandwidth. As an example, "M" can be equal to six and "N" can be equal to three. The source IC (e.g., the first IC 102) may divide the data for the transaction to generate three data cells. Each of the three data cells can include different portions of the data. One of the three data cells may be transmitted to the destination IC (e.g., the sixth IC 112) and each of the remaining two data cells may be transmitted to any of the available intermediate ICs 104, 106, 108, or 110 each for transmitting to the sixth IC 112 in the next cycle. Thus, the system throughput can be increased by making the size of the data cells bigger and reducing the number of data cells transmitted by the source IC.

Figure 2:
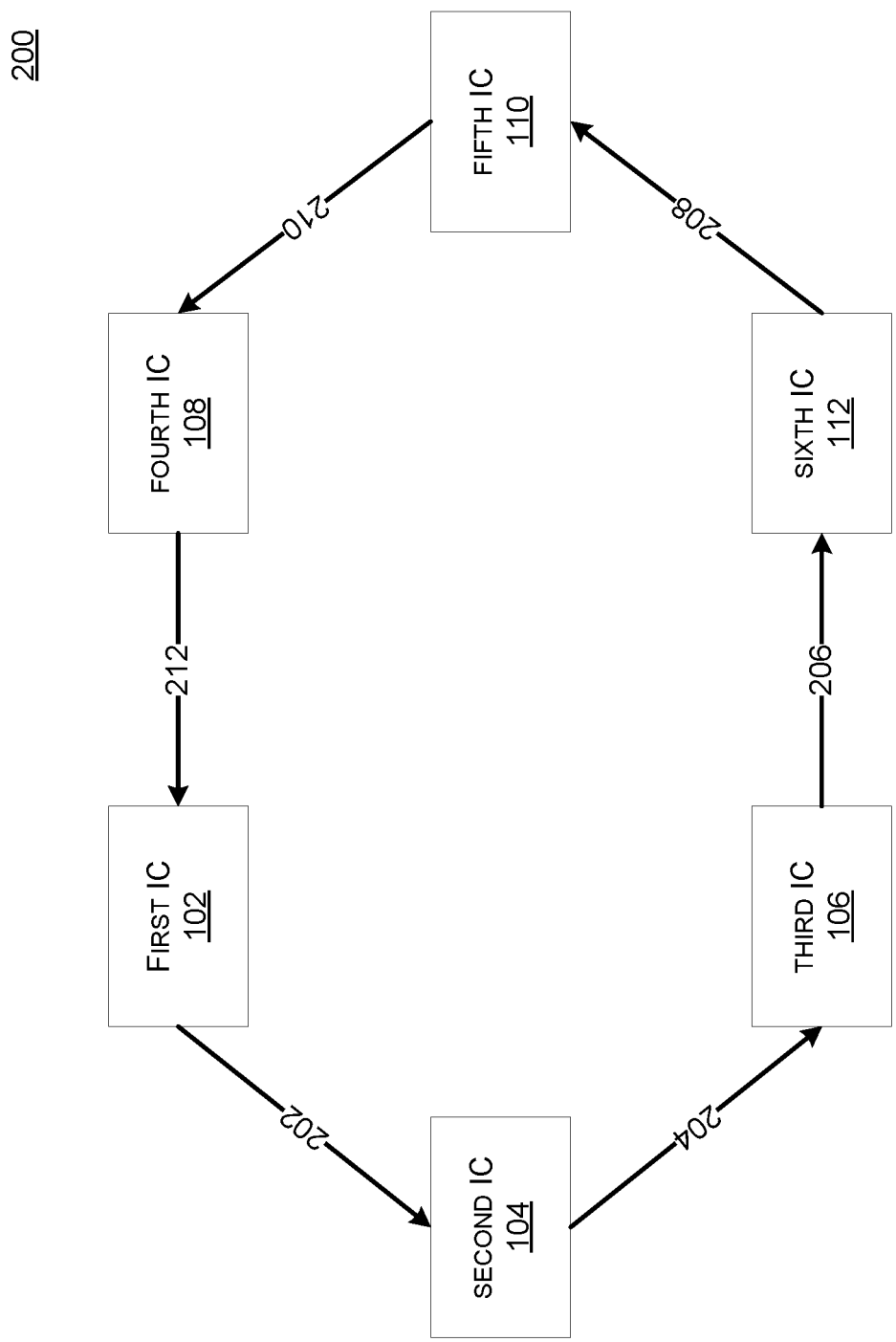
FIG. 2 illustrates an apparatus configured to use unidirectional ring protocol for data transfer between integrated circuits.

FIG. 2 illustrates an apparatus 200 configured to use unidirectional ring protocol for data transfer between ICs.

As illustrated in FIG. 2, in unidirectional or one way ring protocol, each IC may be connected to one IC on each side. The unidirectional ring protocol may only allow transfer of data in a single direction along the ring. In some implementations, the first IC 102 may be configured to communicate with the second IC 104 via an interconnect 202. The second IC 104 may be configured to communicate with the third IC 106 via an interconnect 204. The third IC 106 may be configured to communicate with the sixth IC 112 via an interconnect 206. The sixth IC 112 may be configured to communicate with the fifth IC 110 via an interconnect 208. The fifth IC 110 may be configured to communicate with the fourth IC 108 via an interconnect 210. The fourth IC 108 may be configured to communicate with the first IC 102 via an interconnect 212. Each of the interconnects 202-212 may be point-to-point interconnects. For example, each of the interconnects 202-212 may be based on the PCI express protocol.

In server computers using unidirectional ring protocol for data transfer between the ICs, the latency for the data transfer may depend upon the number of ICs in the ring and the location of the source and the destination IC within the ring. For example, it may take longer to transmit a data cell to the fourth IC 108 by the first IC 102 as compared to transmitting the data cell to the third IC 106 since the data transfer by the first IC 102 to the fourth IC 112 has to go through the second IC 104, third IC 106, sixth IC 112 and the fifth IC 110 via their respective interconnects 202, 204, 206 and 208. In addition, processing time $T_s$ by each IC may add up for each additional IC the data cell has to go through to reach the destination IC.

As an example, assuming that the time to transmit a data cell on the interconnect in unidirectional ring is $T_t$, the time to transfer N data cells may be calculated as $(N \times T_t)$. To transfer N data cells from the first IC 102 to the sixth IC 112, the N data cells have to jump through the second IC 104 and the third IC 106. Therefore, processing time to transfer N data cells form the first IC 102 to the sixth IC 112 will be equal to $(2 \times T_s)$, which includes the processing time taken by the second IC 104 and the third IC 106. Additionally, it may take $T_t$ time each to transfer the data cells from the second IC 104 to the third IC 106 and then from the third IC 106 to the sixth IC 112. Thus, the time to transfer N data cells from the first IC 102 to the sixth IC 112 may be calculated as:

$$(N \times T_t) + 2T_s + (2 \times T_t) = (N+2) \times T_t + 2T_s. \quad \text{Equation (3)}$$

Generalizing equation (3) for "M" number of ICs, the time to transmit "N" data cells may be calculated as:

$$(N \times T_t) + ((M/2)-1) \times T_s + (((M/2)-1) \times T_t) = (N+(M/2-1)) \times T_t + ((M/2)-1) \times T_s. \quad \text{Equation (4)}$$

Thus, as compared to the interconnect architecture discussed with reference to FIG. 1, the unidirectional ring protocol may depend upon the number of ICs in the ring (e.g., "M"). Additionally, in the unidirectional ring protocol, total processing time by the ICs may be dependent on the total number of ICs that need to be jumped to get to the destination IC from the source IC. Therefore, some embodiments may give better performance as compared to unidirectional ring protocol if $T_t$ is significantly smaller than $T_s$.

Figure 3:
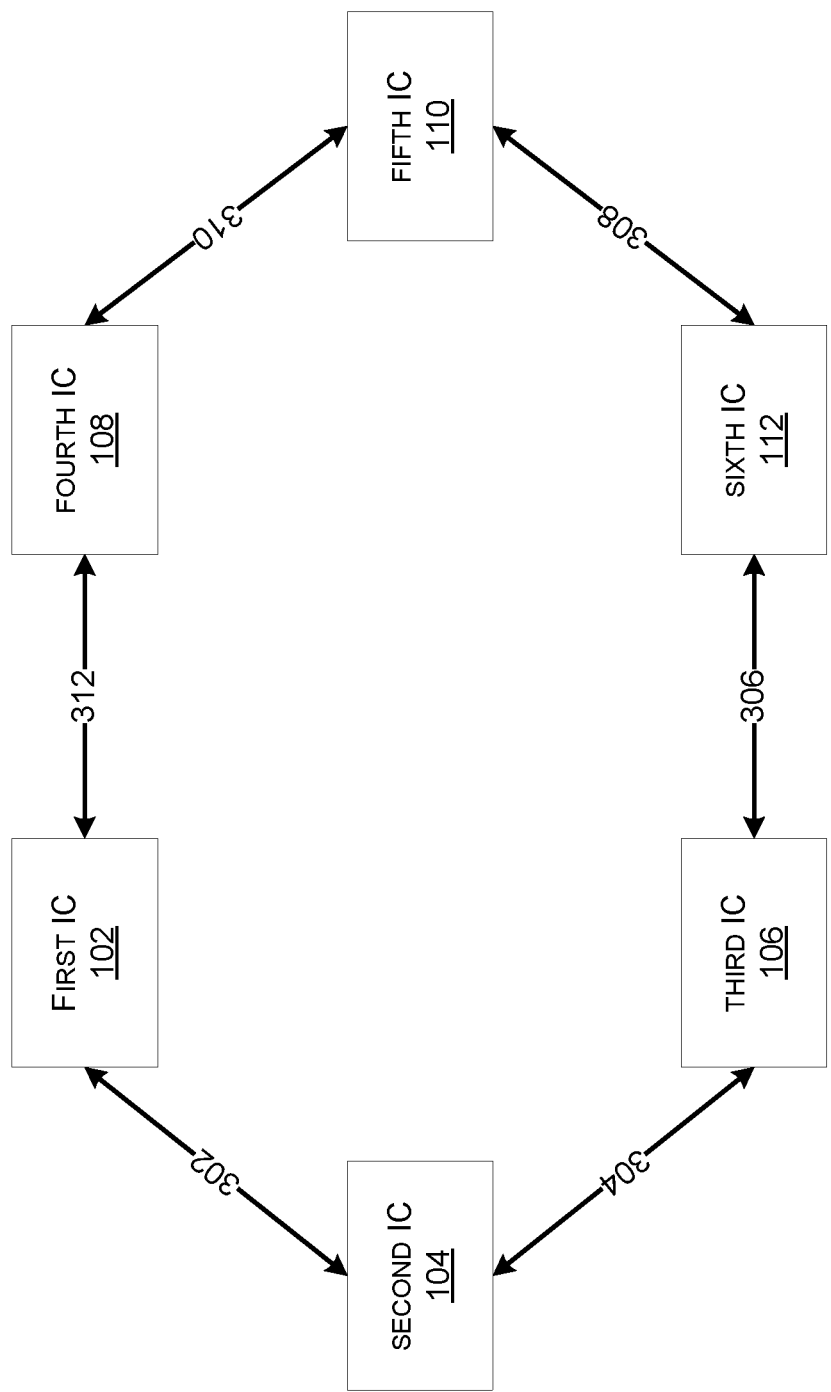
FIG. 3 illustrates an apparatus configured to use bidirectional ring protocol for data transfer between the integrated circuits.

FIG. 3 illustrates an apparatus 300 configured to use bidirectional ring protocol for data transfer between ICs.

As illustrated in FIG. 3, bidirectional or two way ring protocol may allow transfer of data in either direction from a source IC to a connected intermediate or destination IC. In some implementations, the first IC 102 may be configured to communicate with the second IC 104 via an interconnect 302 and with the fourth IC 108 via an interconnect 312. The second IC 104 may be configured to communicate with the first IC 102 via the interconnect 302 and with the third IC 106 via an interconnect 304. The third IC 106 may be configured to communicate with the second IC 104 via the interconnect 304 and with the sixth IC 112 via an interconnect 306. The sixth IC 112 may be configured to communicate with the third IC 106 via an interconnect 306 and with the fifth IC 110 via an interconnect 308. The fifth IC 110 may be configured to communicate with the sixth IC 112 via the interconnect 308 and with the fourth IC 108 via an interconnect 310. The fourth IC 108 may be configured to communicate with the fifth IC 110 via the interconnect 310 and with the first IC 102 via the interconnect 312. Each of the interconnects 302-312 may be point-to-point interconnects. For example, each of the interconnects 302-312 may be based on the PCI express protocol.

In server computers using bidirectional ring protocol for data transfer between the ICs, the latency for the data transfer may depend upon the number of ICs in the ring and the location of the destination IC within the ring. In some implementations, to transfer N data cells by the source IC in a bidirectional ring, the "N" data cells may be divided by two. A first half (e.g., N/2 data cells) may be transmitted in one direction from the source IC and a second half may be transmitted in the other direction from the source IC. For example, to transfer N data cells from the first IC 102 to the sixth IC 112, the first IC 102 may transmit the first half to the second IC 104 via the interconnect 302 and the other half to the fourth IC 108 via the interconnect 312. Thus, the first half may reach the sixth IC 112 through the second IC 104 and the third IC 106, and the second half may reach the sixth IC 112 through the fourth IC 108 and the fifth IC 110 simultaneously. In addition, processing time by each IC may add up for each additional IC the data cells have to go through to reach the destination IC. For example, the time to reach the sixth IC 112 from the first IC 102 for the first half may include processing time taken by the second IC 104 and by the third IC 106. Similarly, the time to reach the sixth IC 112 for the second half may include processing time taken by the fourth IC 108 and by the fifth IC 110.

As an example, assuming that the time to transmit a data cell by an IC on a point-to-point interconnect is $T_t$, the time to transmit N data cells by the first IC 102 in a bidirectional ring may be calculated as $(N/2) \times (2 \times T_t)$. In addition, processing time to transfer N/2 data cells from the first IC 102 to the sixth IC 112 on both sides will be equal to $(2 \times T_s)$, which includes the processing time taken by the second IC 104 and the third IC 106 for the first half and by the fourth IC 108 and the fifth IC 110 for the second half. Additionally, it may take $T_t$ time each to transfer the (N/2) data cells from the second IC 104 to the third IC 106 and then from the third IC 106 to the sixth IC 112 for the first half. Similarly, it may take $T_t$ time each to transfer the (N/2) data cells from the fourth IC 108 to the fifth IC 110 and then from the fifth IC 110 to the sixth IC 112 for the second half. Thus, time to transfer N data cells from the first IC 102 to the sixth IC 112 may be calculated as:

$$(N/2) \times (2 \times T_t) + 2T_s + 2 \times (2 \times T_t) = (N+4) \times T_t + 2T_s. \quad \text{Equation (5)}$$

Generalizing equation (5) for "M" number of ICs, the time to transmit "N" data cells may be calculated as:

$$(N/2) \times (2 \times T_t) + ((M/2) - 1) \times T_s + (((M/2) - 1) \times 2 \times T_t) = (N + (M-2)) \times T_t + ((M/2) - 1) \times T_s. \quad \text{Equation (6)}$$

Thus, as compared to the interconnect architecture discussed with reference to FIG. 1, the bidirectional ring protocol may depend upon the number of ICs in the ring (e.g., "M"). Additionally, in the bidirectional ring protocol, total processing time by the ICs may be dependent on the total number of ICs that need to be jumped for each half to get to the destination IC from the source IC. Therefore, some embodiments may give better performance as compared to bidirectional ring protocol if $T_t$ is significantly smaller than $T_s$.

In some instances, when more than one ICs are performing data transfers for different transactions, each source IC may divide the data for the respective transaction to generate multiple data cells and transmit the respective multiple data cells to the remaining ICs. For example, at any instance, the first IC 102 may be performing a first transaction with the sixth IC 112 and the second IC 104 may be performing a second transaction with the fifth IC 110.

As another example, according to some embodiments, using the interconnect architecture discussed with reference to FIG. 1, the time to transfer N data cells from the first IC 102 to the sixth IC 112 and N data cells from the second IC 104 to the fifth IC 110 can be calculated as:

$$(N/4) \times (5 \times T_t) + T_s + (5 \times T_t) = ((1.25 \times N) + 5) \times T_t + T_s. \quad \text{Equation (7)}$$

In comparison, using the unidirectional ring protocol discussed with reference to FIG. 2, the time to transfer N data cells from the first IC 102 to the sixth IC 112 and N data cells from the second IC 104 to the fifth IC 110 can be calculated as:

$$T_t + T_s + N \times (2 \times T_t) + T_s + (2 \times T_t) = ((2 \times N) + 3) \times T_t + (2 \times T_s). \quad \text{Equation (8)}$$

In further comparison, using the bidirectional ring protocol discussed with reference to FIG. 3, the time to transfer N data cells from the first IC 102 to the sixth IC 112 and N data cells from the second IC 104 to the fifth IC 110 can be calculated as:

$$(2 \times T_t) + T_s + (N/2) \times (4 \times T_t) + T_s + (2 \times (2 \times T_t)) = ((2 \times N) + 6) \times T_t + (2 \times T_s). \quad \text{Equation (9)}$$

Thus, as discussed previously, as compared to the interconnect architecture discussed with reference to FIG. 1, the unidirectional and the bidirectional ring protocol may depend upon the number of ICs in the ring and hence the total processing time in these two protocols may depend on the total number of ICs that need to be jumped for the data cells to get to the destination IC from the source IC. Therefore, some embodiments may give better performance as compared to unidirectional and bidirectional ring protocols if $T_t$ is significantly smaller than $T_s$.

Figure 5:
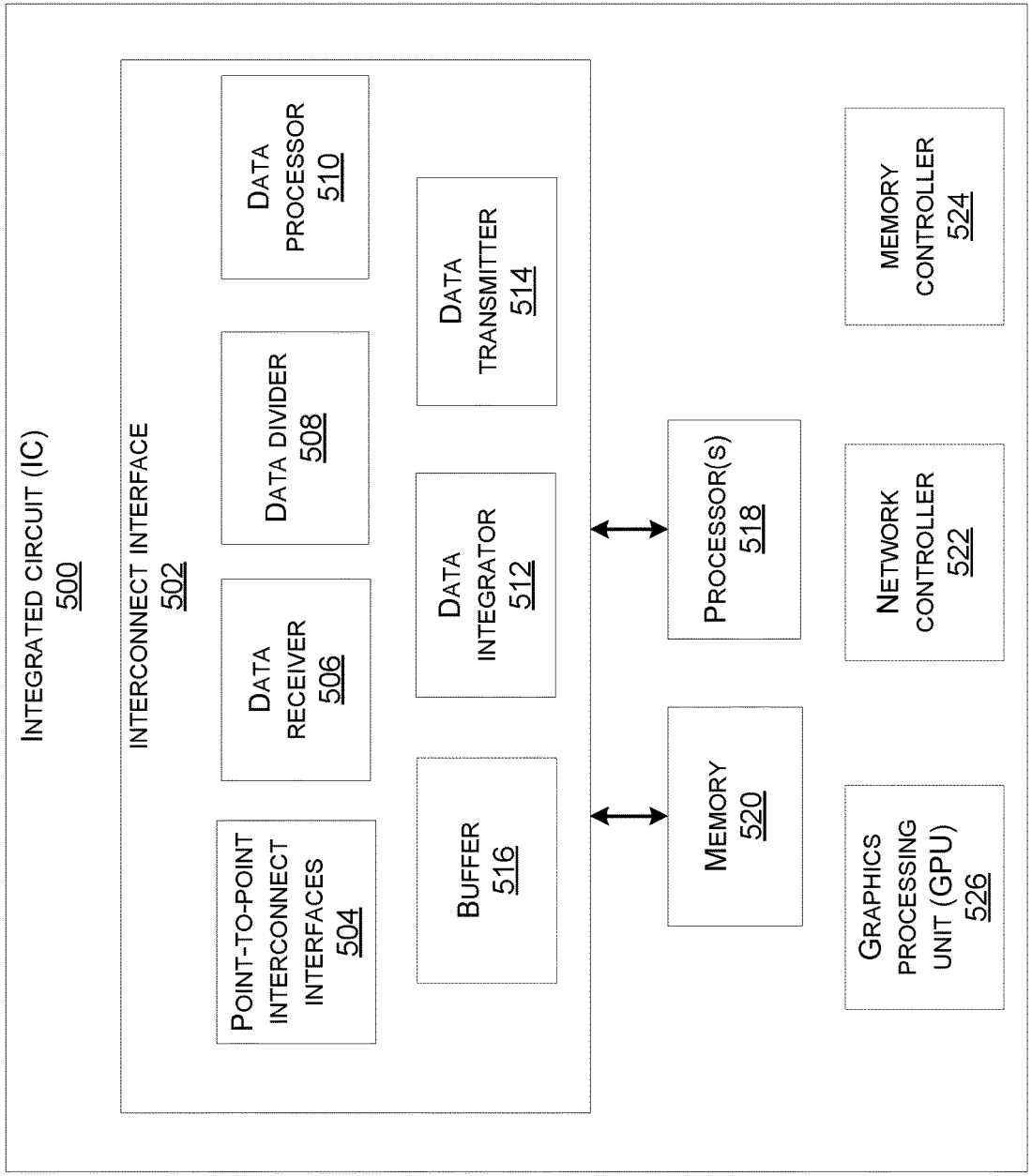
FIG. 5 illustrates a block diagram of an integrated circuit (IC) in some embodiments of the disclosed technologies.

FIG. 5 illustrates a block diagram of an integrated circuit (IC) 500 in some embodiments of the disclosed technologies. The IC 500 may be similar to the first IC 102, second IC 104, third IC 106, fourth IC 108, fifth IC 110, or the sixth IC 112.

The integrated circuit 500 may include an interconnect interface 502, one or more processors 518, memory 520 and an optional graphics processing unit (GPU) 526, a network controller 522 or a memory controller 524 based on the features supported by the integrated circuit 500. In some embodiments, each of the first IC 102, second IC 104, third IC 106, fourth IC 108, fifth IC 110, and the sixth IC 112 may include components with functionalities similar to the functionality of the interconnect interface 502 in addition to specific functionalities supported by each of the ICs 102-112. For example, in some embodiments, any of the ICs 102-112 may include functionalities similar to the functionality of the graphics processing unit (GPU) 526, network controller 522 or the memory controller 524.

The one or more processors 518 may include one or more processing cores. In some implementations, functionality of a root complex may be integrated with the processors 518. In some other implementations, the IC 500 may include the root complex as a discrete component which may be communicatively coupled to the processors 518 and to the memory 520. The memory 520 may include static random access memory (SRAM), dynamic random access memory (DRAM), synchronous DRAM (SDRAM), double data rate (DDR) SDRAM, read only memory (ROM), electrically erasable programmable read-only memory (EEPROM), flash memory or other memory technology, compact disc (CD)-ROM, or any other medium which can be accessed by the processors 518. In some implementations, the memory 520 may include computer readable medium comprising instructions that can be executed by the processors 518 to implement certain functionalities. The computer readable medium may be non-transitory.

The interconnect interface 502 may include point-to-point interconnect interfaces 504, a data receiver 506, a data divider 508, a data processor 510, a data integrator 512, a data transmitter 514, and a buffer 516. The interconnect interface 502 may be configured to provide an interface to communicate with other ICs on the PCB for data transfer.

The point-to-point interconnect interfaces 504 may include a plurality of point-to-point interconnect interfaces for respective interconnects of the IC 500 with other ICs. For example, each of the point-to-point interconnect interfaces of the IC 500 may be configured to communicate with a point-to-point interconnect interface of another IC via a point-to-point interconnect, e.g., PCI express based link. Referring back to FIG. 1, the IC 500 may be similar to the first IC 102, and the point-to-point interconnect interfaces 504 may include interfaces for the interconnects 114, 116, 118, 120, and 122.

In some implementations, each of the point-to-point interconnect interfaces 504 may include respective PCI express ports to provide a point-to-point communication channel with a corresponding PCI express port of the other ICs. Referring back to FIG. 1, the point-to-point interconnect interfaces 504 for the first IC 102 may include a first PCI express port to communicate with a PCI express port of the second IC 104 via the interconnect 114. The interconnect 114 may include one or more lanes to provide a high speed serial link between the first IC 102 and the second IC 104. Similarly, the point-to-point interconnect interfaces 504 for the first IC 102 may include a second PCI express port to communicate with a PCI express port of the third IC 106 via the interconnect 116. The point-to-point interconnect interfaces 504 for the first IC 102 may further include a third PCI express port to communicate with a PCI express port of the sixth IC 112 via the interconnect 118. The point-to-point interconnect interfaces 504 for the first IC 102 may further include a fourth PCI express port to communicate with a PCI express port of the fifth IC 110 via the interconnect 120. The point-to-point interconnect interfaces 504 for the first IC 102 may further include a fifth PCI express port to communicate with a PCI express port of the fourth IC 108 via the interconnect 122.

In some embodiments, the point-to-point interconnect interfaces 504 may also be configured to determine if a particular interconnect with another IC is available for data transfer based on a flow control mechanism for PCI express bus protocol. For example, the point-to-point interconnect interfaces 504 may implement the flow control mechanism to determine if the IC 500 has sufficient credits to transmit the data to another IC or to receive data from another IC. In various embodiments, the point-to-point interconnects between different ICs may be configured differently based on the functionality of the ICs, bandwidth requirements, or any suitable criteria. For example, the interconnect 114 may be configured to include x4 lanes and the interconnect 118 may be configured to include x16 lanes. In some embodiments, the point-to-point interconnect interfaces 504 may also be configured to determine which of the ICs are available for data transfer in case an interconnect with a particular IC is not available. For example, in one instance, the third IC 106 may receive a data cell from the first IC 102 which is destined for the sixth IC 112. However, the point-to-point interconnect interfaces 504 may determine that the interconnect 132 is not available to transmit the data cell to the sixth IC 112, and that the interconnect 136 is available to transfer the data cell to the fourth IC 108. Thus, the data cell may be transmitted to the fourth IC 108 by the data transmitter 514. In some instances, the point-to-point interconnect interfaces 504 may randomly select an available interconnect if more than one interconnects are available. It will be understood that in some instances different point-to-point interconnects for each IC may be serving different transactions simultaneously via different ports. For example, at any point in time, the third IC 106 may be transmitting a first data cell to the sixth IC 112 using the interconnect 132 for a first transaction and may be receiving a second data cell from the fourth IC 108 using the interconnect 136 for a second transaction.

The data receiver 506 may be configured to receive data from another IC via the respective point-to-point interconnect interfaces 504. For example, the IC 500 may be configured as an intermediate IC or a destination IC which can receive data cells from another IC. In one instance, the IC 500 may be configured as an intermediate IC and the data receiver 506 may receive the data cell from a source IC. In another instance, the IC 500 may be configured as a destination IC and the data receiver 506 may receive the data cell from a source IC or an intermediate IC. In some instances, a bandwidth for reception of the data cells via a point-to-point interconnect may be reduced based on the number of the point-to-point interconnect interfaces 504 for the IC 500. In some implementations, the received data cell may include a packet, e.g., a TLP. The packet may include a packet header comprising information associated with the destination of the packet and a sequence number.

The data divider 508 may be configured to divide the data to generate multiple data cells so that each data cell includes a different portion of the data. For example, the IC 500 may be configured as the source IC to transfer data to a destination IC for a transaction. In some implementations, the data divider 508 may be configured to determine the number of data cells to be generated based on a value of "N" programmed in a configuration register (not shown). For example, the configuration register may be part of the memory 520. The value of N in the configuration register may be pre-determined or may be changed during run time (e.g., before a transaction is initiated). Some embodiments can allow different values of N programmed for different source ICs or for different transactions initiated by the same source IC. For example, in a multi-tenant environment, some transactions may need to be processed faster as compared to other transactions and may be assigned higher bandwidth for data transfer. In some implementations, the number of data cells to be generated may depend on the number of ICs connected to the IC 500. For example, if the IC 500 is connected to the destination IC and four intermediate ICs then the data divider 508 may divide the data into five data cells. One data cell may be transmitted to the destination IC and other four data cells may be transmitted to the four intermediate ICs each. In some implementations, the data divider 508 may divide the data into a number of data cells that may be equal, higher, or lower than the number of ICs connected to the IC 500. In some embodiments, the data divider 508 may divide the data into bytes, words or double words as appropriate based on the size of the data. As discussed earlier, 12 DWs of data may be divided into three data cells of size 2 DWs each and two data cells of size 3 DWs each.

The data processor 510 may be configured to process the received data cell to identify the destination IC for transmitting the received data cell. For example, the IC 500 may be configured as an intermediate IC which can receive data cells from the source IC or another intermediate IC. The data processor 510 may parse the packet to extract the data cell and the packet header. Based on the packet header, the data processor 510 may identify the destination IC where the data cells needs to be transmitted. In some implementations, the packet header may include a destination identifier or an address associated with the transaction that may be used to identify the IC. In some embodiments, the intermediate IC may receive two or more data cells that need to be transmitted to the same destination IC. In some implementations, the data processor is further configured to arbitrate between the received data cells to determine which one of the received data cells will be transmitted first to the destination IC. Any suitable arbitration algorithm may be used without deviating from the scope of the disclosed technologies. In some embodiments, the arbitration may be performed based on which of the received data cells is going to take longest to reach the destination IC. For example, the data cell which may jump through a number of intermediate ICs before reaching the destination IC may take longer to reach the destination IC. As discussed previously, with reference to equations (1)-(9), time $T_s$ to process the data cells by the data processor 510 may be independent of the total number of ICs "M."

The buffer 516 may include memory to store the data cells. For example, the IC 500 configured as an intermediate IC may store the data cells in the buffer 516 to transmit to another intermediate IC or to the destination IC. In some instances, the IC 500 configured as a destination IC may store the data cells in the buffer 516 to integrate the data cells with remaining data cells to reproduce the data for the transaction. In some implementations, the buffer 516 may be part of the memory 520.

The data integrator 512 may be configured to integrate the data cells to reproduce the data for the transaction. For example, the IC 500 may be configured as a destination IC. In one instance, the transaction may include writing the data to the memory 520. In another instance, the data may include read data provided by the source IC in response to a read transaction initiated by the destination IC. Thus, the destination IC may consume this data for further processing, e.g., GPU, network, or storage. In some implementations, integrating the data may include concatenating the data cells or assembling the data cells in a certain order. In some embodiments, the data integrator 512 may utilize the sequence number associated with each data cell to integrate the data. In some embodiments, the ordering used for integrating the data may depend upon the system architecture.

The data transmitter 514 may be configured to transmit the data cells via a point-to-point interconnect to another IC. For example, the IC 500 may be configured as a source IC or an intermediate IC. The source IC may transmit the data cells generated by the data divider 508 to the destination IC and the intermediate ICs using the data transmitter 514. In some embodiments, the data transmitter may generate a packet for each data cell to be transmitted to an IC. The packet may include the data cells for the payload and a packet header including information associated with the destination IC and other transaction related information. The data transmitter 514 may transmit the data cells via the point-to-point interconnect interfaces 504. In some instances, a bandwidth for transmission of the data cells on a point-to-point interconnect may be reduced based on the number of the point-to-point interconnect interfaces 504 for the IC 500. In some embodiments, the data transmitter may be configured to transmit the received data cell to another IC only if the respective point-to-point interconnect with that IC is available as determined by the point-to-point interconnect interfaces 504.

The GPU 526 may be configured to perform rapid mathematical calculations, generally executing multiple calculations in parallel. GPUs can be used for rendering computer graphics, as well as for other computationally heavy operations, such as financial modeling, weather modeling, and scientific research. In some embodiments, the IC 500 may include the GPU 526 to perform the GPU functionality.

The network controller 522 may be configured to perform network related functionalities such as monitoring network traffic to regulate the traffic and to manage the bandwidth. The network controller 522 may also be configured to communicate with a network storage device. In some embodiments, the IC 500 may include the network controller 522 to perform the network related functionalities.

The memory controller 524 may be used to communicate with an external memory, e.g., a DRAM or a DDR SDRAM. In some embodiments, the IC 500 may include the memory controller 524 to control the interface with the external memory.

FIG. 6 illustrates a method 600 performed by a source IC in some embodiments of the disclosed technologies. For example, the method 600 may be performed by any of the ICs 102-112 that may need to divide the data to generate the data cells for transmitting to a destination IC for a transaction.

In step 602, a source IC of ICs in a server computer may determine that data needs to be transferred to a destination IC of the ICs for a transaction. Each IC in the ICs may be connected to other ICs via a respective point-to-point interconnect. The ICs may further include intermediate ICs. Referring back to FIG. 1, the source IC may be the first IC 102 from the ICs 102-112 and the destination IC may be the sixth IC 112. The first IC 102 may be configured to transfer data for a transaction to the sixth IC 112. As an example, the transaction may be for writing data to the sixth IC 112. Each of the ICs 102-112 may include at least some of the components of the IC 500 as discussed with reference to FIG. 5. For example, the first IC 102 may at least include the point-to-point interconnect interfaces 504, data divider 508, and the data transmitter 514. The sixth IC 112 may at least include the point-to-point interconnect interfaces 504, data receiver 506, buffer 516, and the data integrator 512.

In step 604, the source IC may generate data cells from the data, wherein each of the data cells includes a different portion of the data. In some implementations, the source IC may generate a pre-determined number of data cells from the data. The number of data cells (e.g., "N") generated from the data can be greater than, less than, or equal to the number of ICs (e.g., "M"). Referring back to FIG. 4, N may be five and the data may be the data 402. As discussed with reference to FIG. 5, the data divider 508 of the first IC 102 may divide the data 402 to generate five data cells so that each data cell includes a different portion of the data. For example, the first data cell 404*a* may include the first data portion 402*a*, the second data cell 404*b* may include the second data portion 402*b*, a third data cell may include a third data portion (not shown), a fourth data cell may include a fourth data portion (not shown), and a fifth data cell 404*n* may include the fifth data portion 402*n*. Each of the data portions may be of the same or different sizes. Each of the data cells may include information associated with the destination of the transaction and the data. For example, each data cell may include a respective destination identifier to identify the destination of the transaction and a sequence number to identify placement of the data portion in the data. The destination identifier may be associated with an address where each data cell or the integrated data for the transaction may be stored. Each of the data cells may include a respective packet.

In step 606, the source IC may transmit one of the data cells to the destination IC and remaining data cells to intermediate ICs via the respective point-to-point interconnect. In some instances, one of the data cells is transmitted to the destination IC in a first cycle and the remaining data cells may be transmitted to the destination IC via the intermediate ICs in a following cycle (e.g., a second cycle). Thus, some embodiments can provide full bandwidth for data transfer within two cycles. Referring back to FIG. 1, the intermediate ICs may include the second IC 104, third IC 106, fifth IC 110, and the fourth IC 108. The first IC 102 may transmit the first data cell 404*a* to the sixth IC 112 via the interconnect 118 in a first cycle. The first IC 102 may transmit remaining data cells, e.g., the second data cell 404*b*, third data cell, fourth data cell, and the fifth data cell 404*n* to the second IC 104, third IC 106, fifth IC 110 and the fourth IC 108 also in the first cycle. For example, the first IC 102 may transmit the second data cell 404*b* to the second IC 104 via the interconnect 114, third data cell to the third IC 106 via the interconnect 116, fourth data cell to the fifth IC 110 via the interconnect 120, and the fifth data cell 404*n* to the fourth IC 108 via the interconnect 122. Note that transmission of the data cells to any of the intermediate ICs may be random without deviating from the scope of the disclosed technologies. The second IC 104, third IC 106, fifth IC 110, and the fourth IC 108 may transmit their respective received data cells to the sixth IC 112 in the second cycle. In some instances, when the number of data cells (e.g., N) generated by the source IC is significantly greater than the number of ICs (e.g., M), the source IC may transmit the data cells to the destination IC via the intermediate ICs over multiple cycles.

In some implementations, the first sequence number 408a in the first data cell 404a transmitted to the sixth IC 112 may identify the placement of the first data portion 402a in the data 402. For example, in one implementation, the first sequence number 408a may include a "1" or a "5" to indicate the placement of the first data portion 402a in the data 402. Similarly, in one implementation, the second sequence number 408b in the second data cell 404b transmitted to the second IC 104 may include a "2" or a "4" to indicate the placement of the second data portion 402b in the data 402. The fifth sequence number 408n in the fifth data cell 404n transmitted to the fourth IC 108 may include a "5" or a "1" to indicate the placement of the fifth data portion 402n in the data 402. Similarly, a third sequence number in the third data cell transmitted to the third IC 106 may include a "3" or a "2" to indicate the placement of a third data portion in the data 402 and a fourth sequence number in the fourth data cell transmitted to the fifth IC 110 may include a "4" or a "1" to indicate the placement of a fourth data portion in the data 402. The data cell received by each of the intermediate ICs 104, 106, 108 and 110 may be forwarded to the sixth IC 112 if the respective point-to-point interconnect is available or to another IC as discussed below with reference to FIG. 7.

Figure 7:
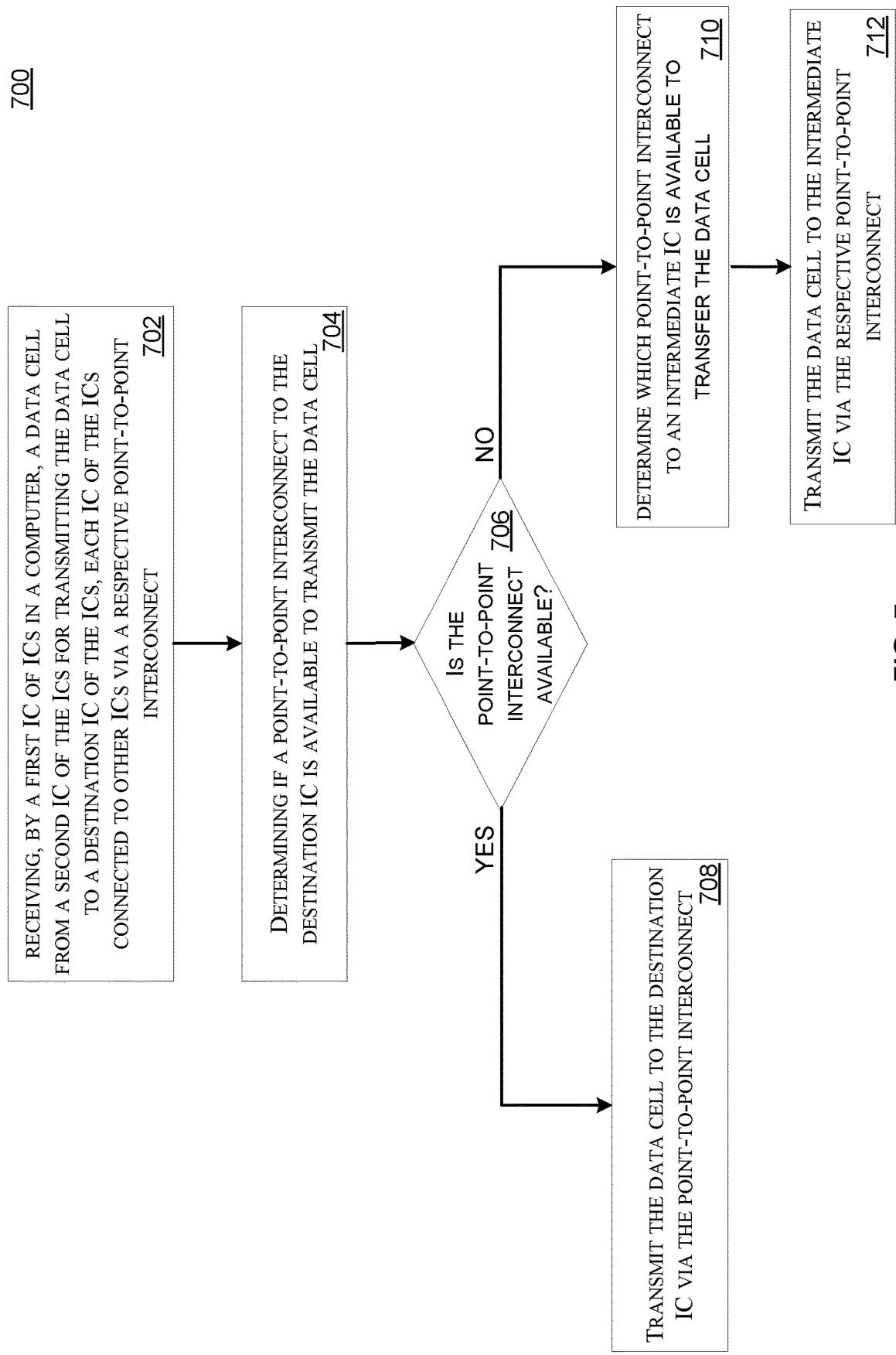
FIG. 7 illustrates a method performed by an intermediate IC in some embodiments of the disclosed technologies.

FIG. 7 illustrates a method 700 performed by an intermediate IC in some embodiments of the disclosed technologies. For example, the method 700 may be performed by any of the ICs 102-112 that are not a source IC or a destination IC for a transaction.

In step 702, a first IC of ICs in a server computer may receive a data cell from a second IC of the ICs for transmitting the data cell to a destination IC of the ICs. Each IC in the ICs may be connected to other ICs via a respective point-to-point interconnect. The data cell may be one of the data cells, 404a, 404b, ..., 404n as discussed with reference to FIG. 4. In one instance, the second IC may be a source IC configured to transmit the data cell to the destination IC via one or more intermediate ICs. For example, the source IC may have divided the data 402 to generate the data cells and the first IC may be one of the intermediate ICs to receive one of the data cells. As an example, M can be six. Referring back to FIG. 1, the first IC from the ICs 102-112 may be the third IC 106, the second IC from the ICs 102-112 may be the first IC 102 and the destination IC from the ICs 102-112 may be the sixth IC 112. In some implementations, the data cell may be received by the data receiver 506 using the point-to-point interconnect interfaces 504. The data processor 510 may process the data to determine that the data cell is to be transmitted to the sixth IC 112. In another instance, the first IC may be a first intermediate IC and the second IC may be a second intermediate IC. For example, the second intermediate IC may have received one of the data cells from the source IC earlier but was not able to transmit that data cell to the destination IC due to the unavailability of its point-to-point interconnect with the destination IC. However, the point-to-point interconnect between the second intermediate IC and the first intermediate IC was available, thus the second intermediate IC forwarded the data cell to the first intermediate IC.

In another example, the first IC from the ICs 102-112 may be the third IC 106, the second IC from the ICs 102-112 may be the fourth IC 108 and the destination IC from the ICs 102-112 may be the sixth IC 112. In an earlier cycle, if the interconnect 140 between the fourth IC 108 and the sixth IC 112 was not available, the fourth IC 108 may have determined if any of the interconnects 122, 130, 136, or 142 with the first IC 102, second IC 104, third IC 106 or the fifth IC 110 respectively was available to forward the data cell. The fourth IC 108 may have determined that the interconnect 136 with the third IC 106 was available and therefore forwarded the data cell to the third IC 106. In some implementations, the received data cell may be stored in the buffer 516 before transmitting to the destination IC or to another intermediate IC.

In step 704, the first IC may determine if a point-to-point interconnect to the destination IC is available to transmit the data cell. For example, the third IC 106 may determine if the interconnect 132 to the sixth IC 112 is available to transfer the data cell. In some embodiments, the point-to-point interconnect interfaces 504 of the third IC 106 may determine if the interconnect 132 to the sixth IC 112 is available using the flow control mechanism implemented by the third IC 106 by determining the available credits for data transfer between the third IC 106 and the sixth IC 112.

In step 706, based on whether the point-to-point interconnect to the destination IC is available, the first IC may perform different actions.

In step 708, if the point-to-point interconnect to the destination IC is available, the first IC may transmit the data cell to the destination IC via the point-to-point interconnect. For example, the third IC 106 may determine that the interconnect 132 to the sixth IC 112 is available to transfer the data cell. The data transmitter 514 of the third IC 106 may transmit the data cell to the sixth IC 112 using the point-to-point interconnect interfaces 504 of the third IC 106. The sixth IC 112 may consume the data cell or store it in the buffer until all the data portions have been received to reassemble the data.

In step 710, if the point-to-point interconnect to the destination IC is not available, the first IC may determine which point-to-point interconnect to an intermediate IC is available to transfer the data cell. As an example, the third IC 106 may determine that the interconnect 124 to the second IC 104 is available to transfer the data cell.

In step 712, the first IC may transmit the data cell to the intermediate IC via the respective point-to-point interconnect. For example, the third IC 106 may transmit the data cell to the second IC 104 via the interconnect 124. Referring back to FIG. 5, the data transmitter 514 of the third IC 106 may transmit the data cell to the second IC 104 via the point-to-point interconnect interfaces 504.

In some instances, some of the steps 702-712 may be executed by all the intermediate ICs in parallel. For example, referring back to FIG. 1, for data transfer for a transaction between the first IC 102 and the sixth IC 112, the first IC 102 may transmit five data cells to the sixth IC 112, second IC 104, third IC 106, fifth IC 110, and the fourth IC 108. In the next cycle, the intermediate ICs, e.g., the second IC 104, third IC 106, fifth IC 110 and the fourth IC 108, may execute some of the steps 702-712 in parallel to process the respective data cells for transmitting to the sixth IC 112. Thus, processing time $T_s$ taken by each of the intermediate ICs, e.g., the second IC 104, third IC 106, fifth IC 110, and the fourth IC 108 may be almost the same.

Figure 8:
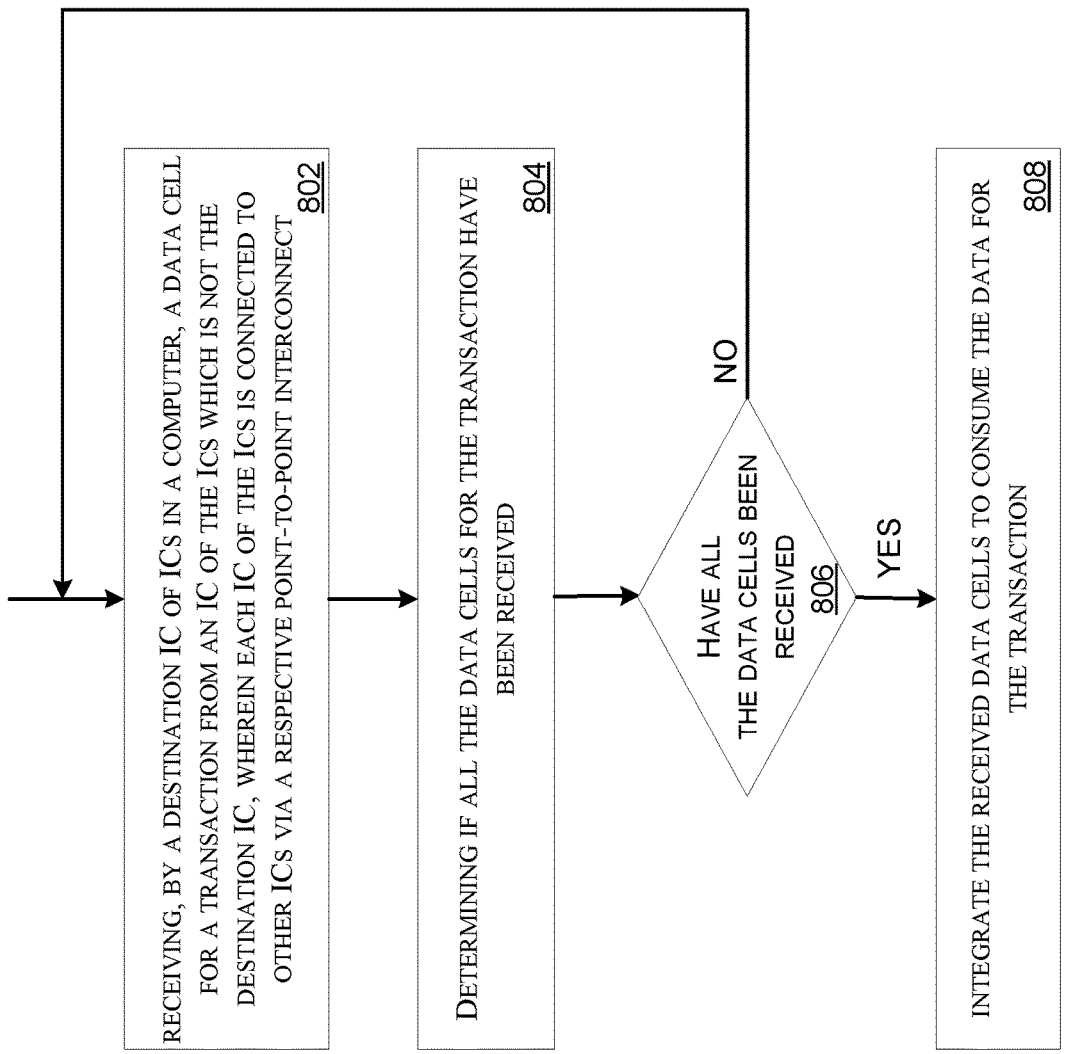
FIG. 8 illustrates a method performed by a destination IC in some embodiments of the disclosed technologies.

FIG. 8 illustrates a method 800 performed by a destination IC in some embodiments of the disclosed technologies. For example, the method 800 may be performed by any of the ICs 102-112 that is not a source IC.

In step 802, a destination IC of ICs in a server computer may receive a data cell for a transaction from an IC of the ICs, which is not the destination IC. The data cell may have been received from a source cell or from an intermediate cell. For example, the destination IC may be the sixth IC 112 from the ICs 102-112 and the source IC may be the first IC 102.

In step 804, the destination IC may determine if all the data cells for the transaction have been received. For example, the sixth IC 112 may or may not have received all five data cells for the transaction initiated by the first IC 102. As discussed earlier, some of the data cells may have been distributed among the intermediate ICs based on the availability of the respective point-to-point interconnects with the destination IC. In some embodiments, the data integrator 512 for the sixth IC 112 may parse each data cell to determine if all the data cells have been received based on the packet header. For example, the packet header may include information associated with the number of data cells for the transaction.

In step 806, the destination IC may determine if all data cells for the transaction have been received to determine if the data cells can be integrated for the transaction. For example, if all the data cells have not been received, the sixth IC 112 may wait to receive remaining data cells before integrating all the data cells associated with the transaction. In some embodiments, each data cell received by the sixth IC 112 can be consumed by the sixth IC 112 based on the packet header. For example, instead of waiting for the remaining data cells for the transaction, the sixth IC 112 may store each data cell in the memory 520 associated with the sixth IC 112 at an address provided in the packet header for the transaction.

In step 808, the destination IC may integrate the received data cells to consume the data for the transaction. Referring back to FIG. 5, the data integrator 512 for the sixth IC 112 may integrate the data cells based on the sequence number associated with each data to provide the data for the transaction. The data may be consumed by the processors 518, e.g., by writing to the memory 520, used by the GPU, 526 or the network controller 522.

Embodiments of the disclosed technologies provide an interconnect architecture for a plurality of ICs such that each IC is connected to all other ICs via a respective point-to-point interconnect. As compared to the unidirectional and bidirectional ring based architectures, some embodiments can provide lower latency and higher throughput for data transfers among the ICs by splitting the data transfer bandwidth among the interconnects, as discussed with reference to FIG. 1-FIG. 3. In some instances, data transfer to the destination IC from the intermediate ICs can provide full bandwidth if their respective point-to-point interconnects to the destination IC are available. It will be understood that even though FIGS. 1-8 have been described for a server computer, the embodiments are not limited to only server computers and can be applied to other types of multi-socket computers without deviating from the scope of the disclosed technologies.

Figure 9:
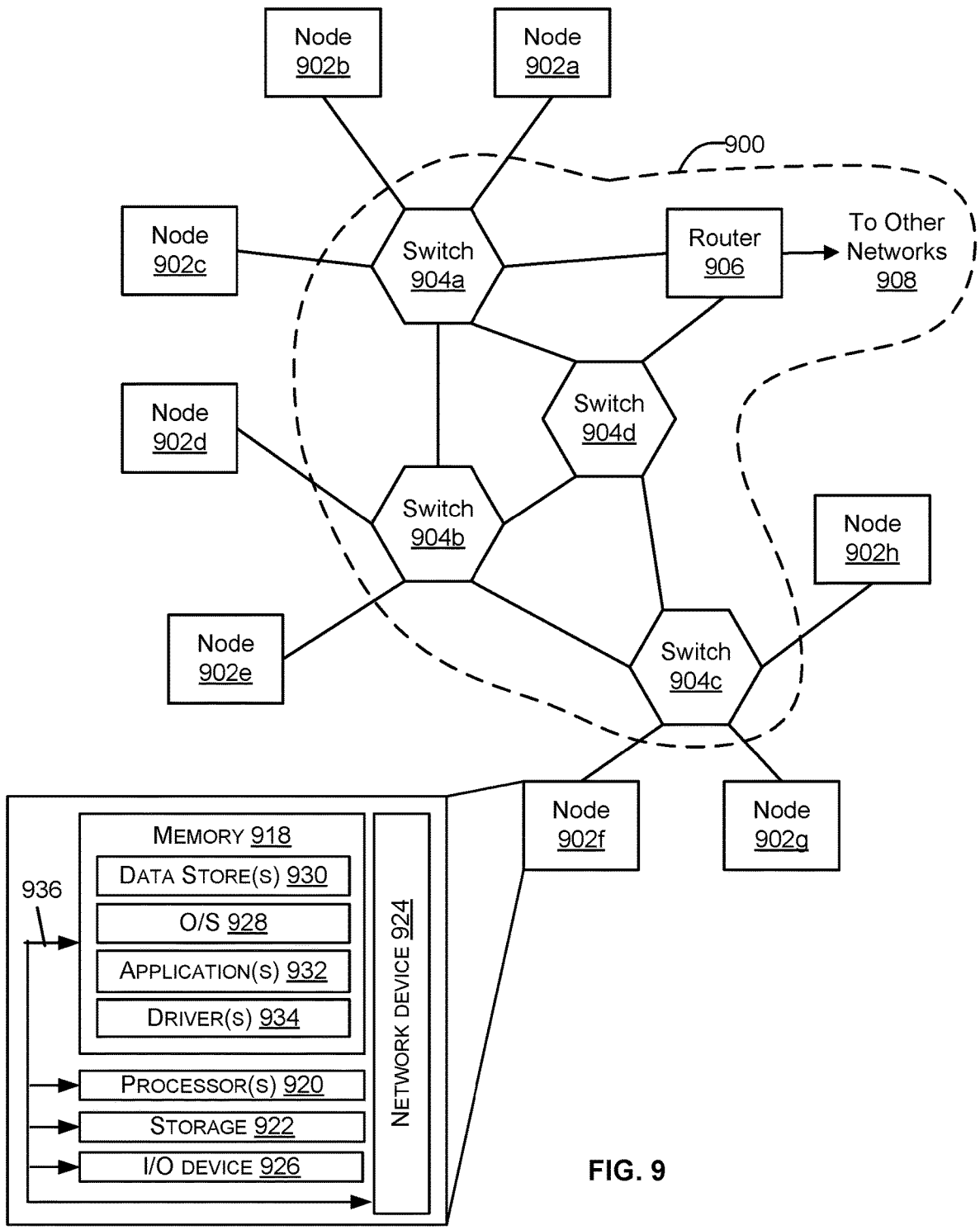
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of nodes comprising server computers, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers, server computers, or third party computers. For example, some or all of the nodes 902a-902h may be similar to the server computer based on the interconnect architecture shown in FIG. 1. Further, some or all of the nodes 902a-902h may utilize any of the components or functionalities of the IC500, as discussed with reference to FIG. 5.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processing unit can include any of the integrated circuits described herein (e.g., IC 500). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 908 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer, comprising:
   integrated circuits (ICs), each IC from the ICs connected to other ICs using a respective point-to-point interconnect, wherein the ICs include a source IC, a destination IC, and intermediate ICs;
   wherein the source IC is configured to:
      determine that data needs to be transferred to the destination IC for a transaction;
      generate a predetermined number of data cells from the data, wherein the predetermined number is based on a number of point-to-point interconnects to the other ICs, wherein each of the data cells includes a different portion of the data, wherein a time for "M" number of ICs to transmit "N" number data cells from the source IC to the destination IC is $(N+(M-1))\times T_t+T_s$, where $T_t$ is a time to transmit a data cell on a single point-to-point interconnect, and $T_s$ is a time for each IC to simultaneously process a received data cell from the source IC;
      transmit at least one of the data cells to the destination IC via the respective point-to-point interconnect; and
      transmit other data cells to the intermediate ICs via the respective point-to-point interconnects;
   wherein each intermediate IC is configured to:
      receive one of the other data cells via the respective point-to-point interconnect;
      process the received data cell to determine that the received data cell is to be transmitted to the destination IC;
      determine if a point-to-point interconnect to the destination IC is available; and
      transmit the received data cell to the destination IC upon determining that its point-to-point interconnect to the destination IC is available; and
   wherein the destination IC is configured to:
      receive the one of the data cells from the source IC via the respective point-to-point interconnect;
      receive the other data cells from the intermediate ICs via the respective point-to-point interconnects; and
      consume the data cells.

2. The computer of claim 1, wherein each intermediate IC is further configured to:
   transmit the received data cell to another intermediate IC using the respective point-to-point interconnect upon determining that its point-to-point interconnect to the destination IC is not available.

3. The computer of claim 1, wherein each point-to-point interconnect is based on peripheral component interconnect (PCI) express protocol.

4. An apparatus, comprising:
   integrated circuits (ICs), each IC from the ICs connected to other ICs using a respective point-to-point interconnect, the ICs comprising a source IC, a destination IC, and an intermediate IC,
   wherein the source IC is configured to transmit data for a transaction to the destination IC by generating a predetermined number of data cells from the data, wherein the predetermined number is based on a number of point-to-point interconnects to the other ICs, wherein each data cell includes a different portion of the data, wherein a time for "M" number of ICs to transmit "N" number data cells from the source IC to the destination IC is $(N+(M-1))\times T_t+T_s$, where $T_t$ is a time to transmit a data cell on a single point-to-point interconnect, and $T_s$ is a time for each IC to simultaneously process a received data cell from the source IC, and
   wherein one of the data cells is transmitted to the destination IC by the source IC using the point-to-point interconnect between the source IC and the destination IC, and wherein the remaining data cells are transmitted to the destination IC via the intermediate IC using the intermediate IC's point-to-point interconnects.

5. The apparatus of claim 4, wherein the source IC comprises:
   a respective point-to-point interconnect interface configured to communicate with each of the other ICs;
   a data divider configured to generate the data cells; and
   a data transmitter configured to transmit the data cells to the other ICs.

6. The apparatus of claim 4, wherein the intermediate IC comprises:
   a respective point-to-point interconnect interface configured to communicate with each of the other ICs;
   a data receiver configured to receive a data cell from any of the other ICs;
   a data processor configured to process the received data cell to identify the destination IC for transmitting the received data cell; and
   a data transmitter configured to transmit the received data cell to any of the other ICs via the respective point-to-point interconnect interface.

7. The apparatus of claim 6, wherein the data receiver receives two or more data cells, and wherein the data processor is further configured to determine which one of the received data cells will be transmitted first to the destination IC.

8. The apparatus of claim 7, wherein the determining is performed based on which of the received data cells will take longest to reach the destination IC.

9. The apparatus of claim 7, wherein the data transmitter is configured to transmit the received data cell to the destination IC only if the respective point-to-point interconnect with the destination IC is available.

10. The apparatus of claim 4, wherein the destination IC comprises:
    a respective point-to-point interconnect interface configured to communicate with each of the other ICs;
    a data receiver configured to receive data cells from the other ICs;
    a data integrator configured to integrate the received data cells to reproduce the data; and
    memory configured to store the received data cells or the integrated data.

11. The apparatus of claim 10, wherein the data integrator is further configured to reorder the data cells before integrating the data cells.

12. The apparatus of claim 4, wherein the source IC generates a pre-determined number of data cells from the data.

13. The apparatus of claim 4, wherein each of the data cells comprises a packet comprising a packet header.

14. The apparatus of claim 13, wherein the packet header for each data cell includes a destination identifier and a sequence number.

15. The apparatus of claim 4, wherein the transaction is a transaction to write the data to an address associated with the destination IC or to read the data from an address associated with the source IC.

16. The apparatus of claim 4, wherein each of the ICs is in a respective socket on a printed circuit board (PCB).

17. The apparatus of claim 4, wherein each of the ICs includes a processing core and memory.

18. A method comprising:
  determining, by a source integrated circuit (IC) of ICs in a computer, that data needs to be transferred to a destination IC of the ICs for a transaction, each IC in the ICs connected to other ICs via a respective point-to-point interconnect, the ICs further comprising intermediate ICs;
  generating a predetermined number of data cells from the data, wherein the predetermined number is based on a number of point-to-point interconnects to the other ICs, wherein each of the data cells includes a different portion of the data, wherein a time for "M" number of ICs to transmit "N" number data cells from the source IC to the destination IC is $(N+(M-1))\times T_t+T_s$, where $T_t$ is a time to transmit a data cell on a single point-to-point interconnect, and $T_s$ is a time for each IC to simultaneously process a received data cell from the source IC; and
  transmitting one of the data cells to the destination IC and remaining data cells to the intermediate ICs via the respective point-to-point interconnect.

19. The method of claim 18, wherein the ICs include M number of ICs and the source IC generates N number of data cells, wherein N is less than M, and wherein the destination IC receives one of the N data cells in a first cycle via a point-to-point interconnect between the source IC and the destination IC, and the remaining data cells in a following cycle via the intermediate ICs.

20. The method of claim 18, wherein a bandwidth for transmitting each of the data cells is reduced based on a number of data cells generated by the source IC.

* * * * *